United States Patent
Houwen

(10) Patent No.: US 7,238,150 B2
(45) Date of Patent: Jul. 3, 2007

(54) METHOD FOR CALCULATING THE TURBULENCE FACTOR FOR A DECANTING CENTRIFUGE

(76) Inventor: Otto H. Houwen, 54 High Street, Colon, Cambridge (GB) CB3 7PL (*) Notice: Subject to any disclaimer, the term of this patent is extended or adjusted under 35 U.S.C. 154(b) by 85 days.

(21) Appl. No.: 11/168,285

(22) Filed: Jun. 28, 2005

(65) Prior Publication Data
US 2006/0003881 A1    Jan. 5, 2006

Related U.S. Application Data

(60) Provisional application No. 60/583,385, filed on Jun. 28, 2004.

(51) Int. Cl.
*B04B 1/20* (2006.01)

(52) U.S. Cl. .......................... 494/37; 700/273
(58) Field of Classification Search .................. 494/1, 494/10, 37, 50–55, 85; 700/273; 210/380.1, 210/380.3
See application file for complete search history.

(56) References Cited

U.S. PATENT DOCUMENTS 5,182,020 A * 1/1993 Grimwood
5,948,271 A * 9/1999 Wardwell et al.
6,416,454 B1 * 7/2002 Kessler et al.
6,860,845 B1 * 3/2005 Miller et al.
2006/0003881 A1 * 1/2006 Houwen

* cited by examiner

*Primary Examiner*—Charles E. Cooley
(74) *Attorney, Agent, or Firm*—M-I L.L.C.

(57) ABSTRACT

A method for modeling the effect of turbulence on the cut point function of a decanting centrifuge includes inputting data related to the centrifuge including the bowl radius, $r_2$, the pond top radius, $r_1$, the bowl length, $L_B$, the angular velocity, $\omega$, of the centrifuge into an analyzer, measuring data related to the feed fluid including a fluid density, $\rho_f$, a particle density $\rho_s$, a fluid viscosity, $\mu$, and the flow rate, Q, and inputting the measured data into the analyzer, calculating a $d_{100}$ cut point as a function of the flow rate, modeling a first cut functions for laminar flow as a function of a particle diameter, $d_i$, using the calculated $d_{100}$ cut point function, calculating a maximum point within the pond, $I_b$, $I_p$, at which a particle having particle diameter, $d_i$, must reach a laminar boundary layer within the pond to be captured within the bowl, wherein $I_b$ is defined as the distance from the inlet at which the particle having particle diameter, $d_i$ encounters the laminar boundary layer and $I_p$ is defined as the height of the boundary layer above a bottom of the pond and modeling a second cut function for turbulent flow having a laminar boundary layer along the bowl inner surface as a function of particle diameter, $d_i$. A turbulence factor is used to model the second cut function and may be used to predict a corrected cut point as a function of particle diameter.

14 Claims, 6 Drawing Sheets

METHOD FOR CALCULATING THE TURBULENCE FACTOR FOR A DECANTING CENTRIFUGE

This application claims the benefit of U.S. Provisional Application No. 60/583,385, filed Jun. 28, 2004 the contents of which are incorporated herein by reference. New matter has been added to this specification for which priority is not claimed.

BACKGROUND OF INVENTION

Experimental evidence has been published by Thurber (MSc thesis University of Tulsa, 1988, p. 61) that led him to state that the settling velocity predicted by Stokes' law in the case of a decanter has to be reduced. He found a crude empirical expression saying that at shallow pond depths (<0.125 ft) and high processing rates ">75% of "maximum rate" the settling velocity was reduced by a factor 0.3 found from regression analysis. At processing rates greater than 50% of the "maximum rate" a reduction factor of 50% was found.

As it is generally known that reducing turbulence in a decanter will lower the cut point, and since (apart from Thurber's observations) no published analytical approach exists that can help taking into account the influence of turbulence in the design and optimization of decanter operation, a new analytical method has been found to fill this gap in knowledge. The present invention models this analytical method, but it will be obvious that more intricate geometries than the one described here can better be dealt with by Computational Fluid Dynamics. The underlying principle remains the same, that is finding areas of turbulence by applying some criterion based on Reynolds number.

As is described in advanced engineering text books (see e.g. Coulson and Richardson), entry of a fluid from a differently shaped reservoir into a pipe or slot will result in an initial zone where turbulent flow prevails. After a certain distance, the entry length, the fluid has developed a laminar velocity profile, see FIG. 1. This transition is marked by a thickening of a boundary layer, the thickness of which is proportional to the square root of the distance from the entry point. The laminar region is therefore surrounded by a parabolic boundary. In the case of slot flow, fully established laminar flow is achieved when the boundary layers meet each other.

Collins and Schowalter have studied these effects for non-Newtonian fluids in two papers dealing respectively with entry into a pipe and a channel (A.I.Ch.E.Journal, 1963). For the purposes of the invention described herein, it is sufficient to summarize their results by stating that the ratio Entry Length/Hydraulic Diameter multiplied by Reynold's number is equal to a constant value. For pipes this value is 0.05 and for slots this value is 0.0088.

The conclusions from Thurber's thesis suggest that a relationship of the same form as found by Collins and Schowalter can be used to describe turbulence in the pond of a decanting centrifuge. It would be an improvement in the art to develop a model incorporating the effects of both turbulent and laminar flow. Such a model further accounting for the formation laminar boundary layer within the pond of a decanting centrifuge could be used to improve centrifuge design as well as to more accurately predict the cut point function of a centrifuge.

SUMMARY

Disclosed herein is a new model of particle settling in a decanting centrifuge. The model contains a mathematical treatment of the trajectory of the solid particles in the fluid during their stay in the centrifuge bowl. This trajectory is described as a function of the degree by which turbulent or laminar flow conditions prevail in any part of the bowl which the particle traverses on its way from the inlet to the outlet.

The equations developed in this model provide an algorithm for prediction of the capture efficiency of each particle as a function of its equivalent diameter and its density. Applying the model to a suspension of particles of different size, which is the common type of feed fluid in application of a decanting centrifuge to drilling operations, the model reveals that small sized particles and large particles are affected to a different degree by the development of laminar flow conditions close to the inner wall of the bowl. As a result, the algorithms described in the new model enable design optimization and selection of operating parameters that are conducive to separation characteristics desirable for certain decanter operations.

By way of example of application, the model makes it possible to optimize the design of a decanter for the purpose of separating barite out of a used drilling fluid for the purpose of recycling the barite, while retaining small sized particles in the liquid overflow so that these fines are selectively separated from the barite and would not prevent re-use of the barite on the ground that it would be too much contaminated by the unwanted fines.

Other aspects and advantages of the claimed subject matter will be apparent from the following description and the appended claims.

DETAILED DESCRIPTION

Figure 7:
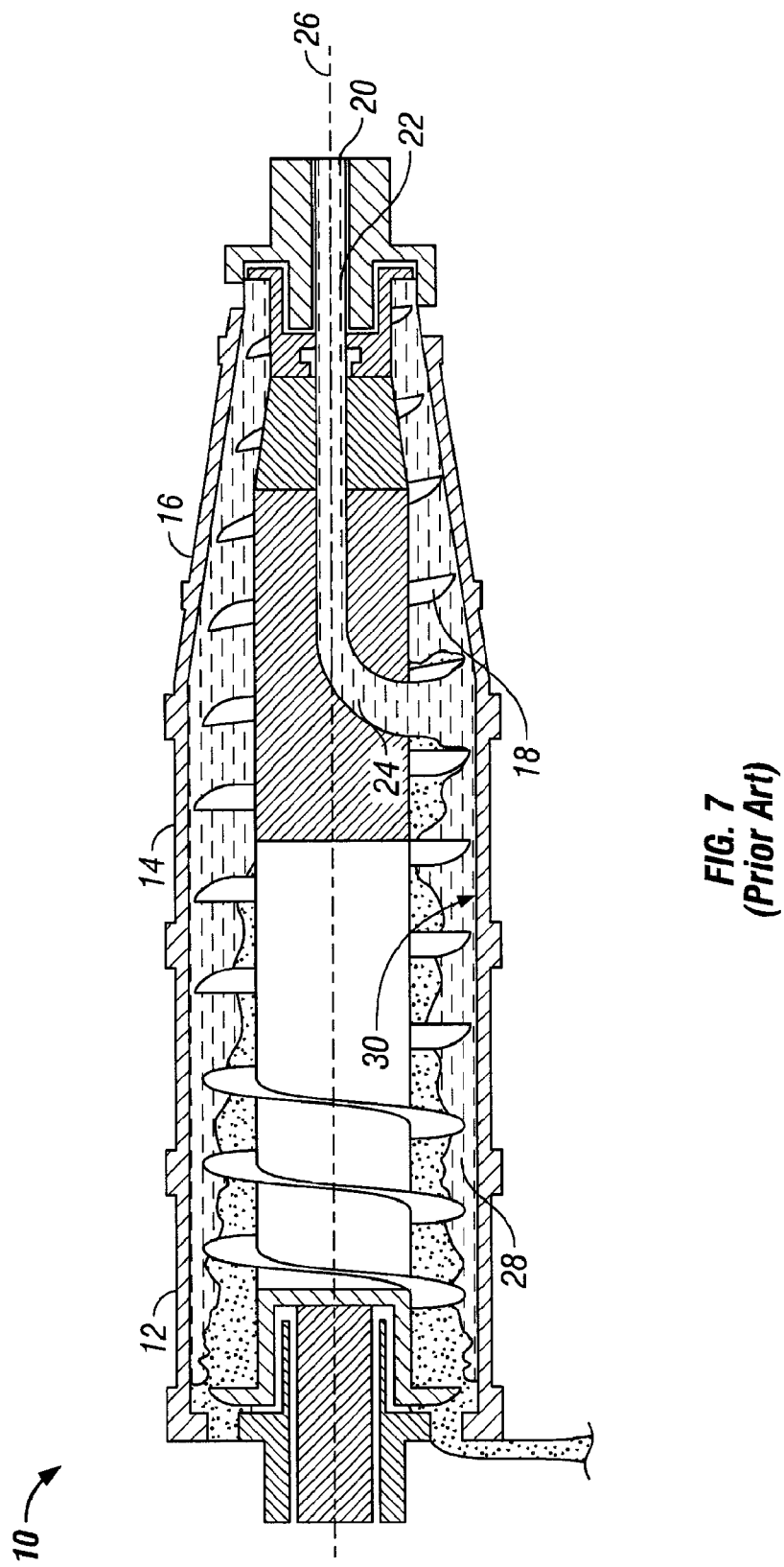
FIG. 7 is a prior art schematic of a decanting centrifuge.

The following discussion shows the application of a developed model of a cut function to a decanting centrifuge. Referring to FIG. 7, a typical decanting centrifuge 10 includes a bowl 12 housed within a protective housing (not shown). The bowl 12 is often has a cylindrical section 14 and a conical section 16. A scroll-type conveyor 18 is located within the bowl 12. Feed fluid is directed into the centrifuge 10 through an inlet 20 at a predetermined flow rate, Q. From inlet 20, the feed fluid is directed through a central feed tube 22 to a bowl inlet 24. The bowl inlet 24 radially provides the feed fluid to the bowl 12. The bowl 12 is rotated about a central axis 26 at a predetermined rotational speed. A pond of fluid 28 forms along the inner surface 30 of bowl 12.

The following derivations are based on Ambler's Sigma model for a decanter. They assume Newtonian flow, but as Collins and Schowalter already demonstrated a numerical approach will help dealing with non-Newtonian fluids. Simple adaptations of Stokes' law to power-law fluids also exist, see e.g. Thurber's thesis.

The present discussion is to our knowledge the first to take numerically into account the effect on settling behavior in a turbulently moving decanter bowl and thereby to correct the existing partition functions.

Particle Trajectory

Figure 1:
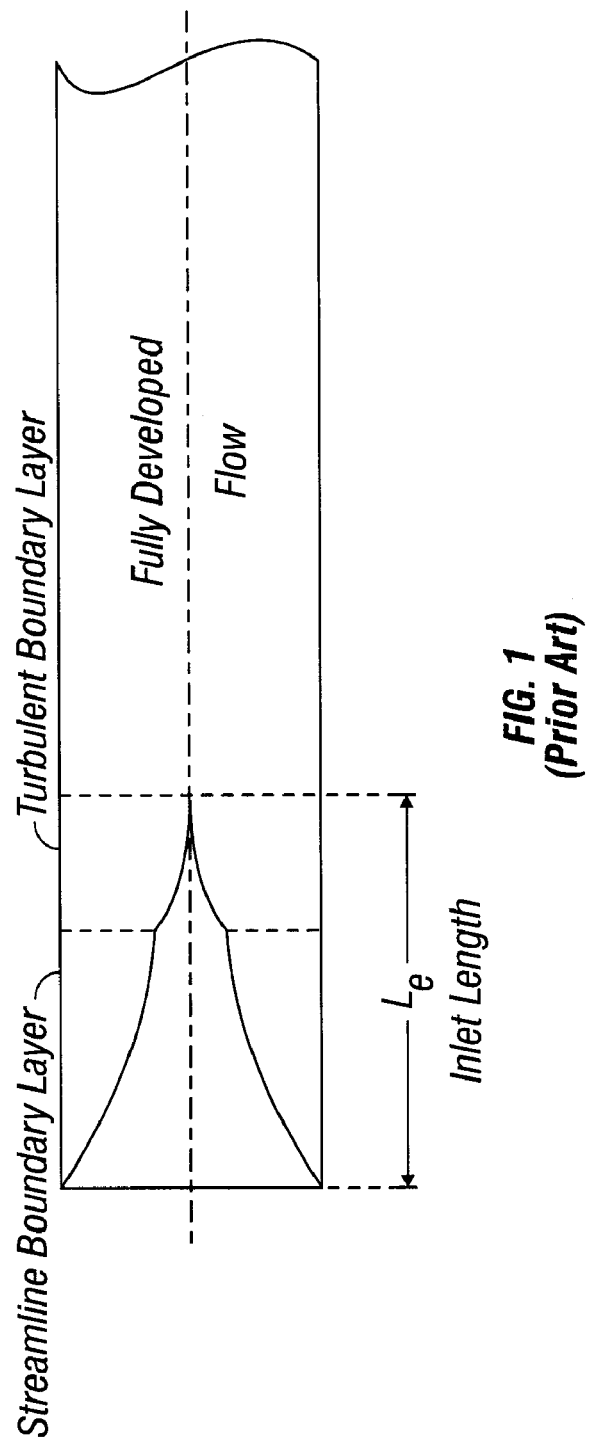
FIG. 1 is a prior art schematic of the entry length for fully developed flow.
Figure 2:
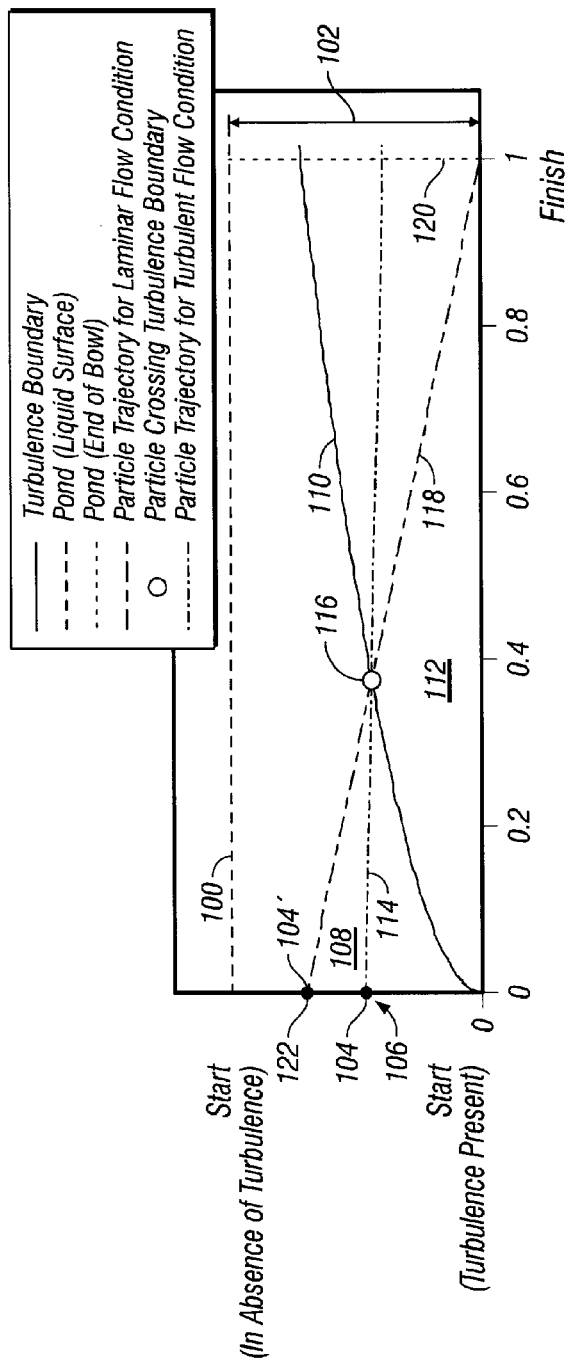
FIG. 2 is a schematic showing the principle of turbulent effect on particle settling.

With reference to FIG. 2, a pond 100 within a decanting centrifuge (not shown) is schematically shown having a pond depth 102. A particle 104 starts settling about in the middle 106 of the available pond depth 102 at a point labeled "start (turbulence present)". It is initially in the turbulent region 108 above the parabolic boundary 110 of the laminar flow region 112 and therefore moves nearly horizontally along the trajectory for turbulent flow conditions 114. It then crosses the parabolic boundary 110 at a point referred to herein as 116 and changes its direction to a steeper downward slope 118, governed by the laminar flow velocity profile prevailing in the laminar region 112 (horizontal velocity component) and the settling velocity according to Stokes' law. The particle 104 shown reaches the end 120 of the bowl (labeled "finish") just in time to be captured in the solid underflow. It has, therefore, the $d_{100}$ particle size (see next section for definition).

Particles of this size must start at the point 106 labeled "start (turbulence present)", or below, in order to be captured in the underflow. All particles of the same size starting above this point 106 will be swept out of the bowl with the liquid overflow.

To show the effect of the existence of a turbulent region 108, another point 122 has been labeled "start (in absence of turbulence)". A particle 104' starting here, in the case of practically immediately established laminar flow (i.e. at an appropriately very low flow rate, or in the case of a very low pond depth/bowl length ratio), will travel according to the trajectory 118 for laminar flow conditions from start to finish. The difference in trajectories in the two cases shown leads to a different value of the chance of a particle with given diameter to be captured in the underflow, as a function of the flow rate in a given pond geometry, since it is the flow rate that governs the development of a laminar flow region.

A complete cut curve for particles of different sizes is calculated by varying the trajectory slope in the laminar region. A low slope value corresponds to small particles, which should always start low in the pond in order to be captured.

Algorithm for $d_{100}$

The Sigma equations are normally established for the case of a single particle diameter d and a fixed angular velocity $\omega$. The flow rate is understood to have been adjusted to the maximum value $Q_{100}$ that allows 100% capture of the particles in the underflow.

Figure 3:
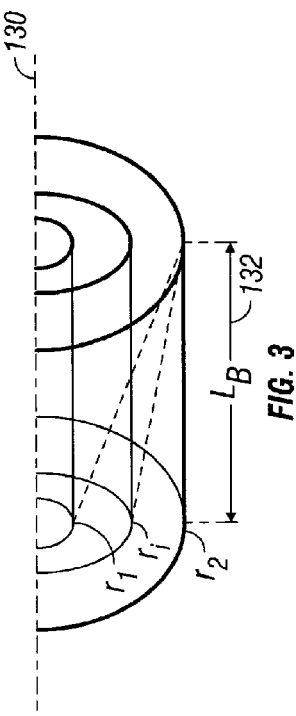
FIG. 3 is a schematic showing settling in a decanting centrifuge bowl.

With these assumptions we derive first in the case where turbulence is absent the cut function $f(d)$ for a decanter into which a feed of particles with a distribution of diameters $f_{feed}(d)$ is pumped with any set flow rate Q. There will be, then, a value of d for which this set flow rate Q is equal to $Q_{100}$. Hence, solving the equation $$Q_{100} = V_g(d)\dot{\Sigma} = \frac{\Delta \rho d^2 g}{18\mu}\Sigma \qquad \text{Eq. 1}$$

for d, we find a diameter that can be designated $d_{100}$; all particles with $d \geq d_{100}$ will be captured, but particles with $d < d_{100}$ will have a capture probability $f(d) < 1$, see FIG. 3. Therefore, $d_{100}$ is the diameter of the particles that enter the centrifuge at the liquid surface level $r_1$ and reach the inner radius of the bowl $r_2$ just before they would be swept out. Particles with $d_{100}$ but entering the bowl at any radius $r > r_1$ will also be captured. Therefore, $d_{100}$ is the diameter of the particles that enter the centrifuge at the liquid surface level $r_1$ and reach the inner radius of the bowl $r_2$ just before they would be swept out, wherein $r_1$ and $r_2$ represent a distance from a central axis 130. Particles with $d_{100}$ but entering the bowl at any radius $r > r_1$ will also be captured. Therefore, if the bowl length 132 is L, then all particles with $d_{100}$ in the volume $\pi L(r_2^2 - r_1^2)$ will be captured.

Particles with a smaller diameter, $d_i < d_{100}$, need to enter at some radius $r_i > r_1$ in order to be captured with 100% efficiency. All particles with $d_i$ in the volume $\pi L(r_2^2 - r_i^2)$ will be captured. Therefore, the capture efficiency $f(d_i)$ for particles with $d_i < d_{100}$, relative to that of particles with $d_{100}$ follows from the ratio of the two volumes concerned:

$$f(d_i) = \frac{r_2^2 - r_i^2}{r_2^2 - r_1^2} = \frac{1 - \frac{r_i^2}{r_2^2}}{1 - \frac{r_1^2}{r_2^2}}, \qquad \text{Eq. 2}$$

in which the only unknown is $r_i$. An expression for $r_i$ as a function of $d_i$ needs now to be found and substituted into Eq.2 to get the desired cut function $f(d)$.

Because we are dealing with the same flow rate, according to Eq. 1 we can write $$Q_{100}{}^{d=d_{100}} = Q^{d=d_i}$$

from which, using the exact expression for $\Sigma$, $$\Sigma_{exact} = \frac{\omega^2}{g} \frac{Vol}{\ln\frac{r_2}{r_1}}. \qquad \text{Eq. 3}$$

by analogy with the expression for the maximum flow rate allowed for 100% capture of particles with diameter $d_i$ $$Q_{100} = \frac{Vol}{T_{r_1-r_2}} = V_g \frac{\omega^2}{g} \frac{Vol}{\ln\frac{r_2}{r_1}}$$

we get $$V_g^{d=d_{100}} \frac{\omega^2}{g} \frac{Vol}{\ln\frac{r_2}{r_1}} = V_g^{d=d_i} \frac{\omega^2}{g} \frac{Vol}{\ln\frac{r_2}{r_i}}$$

where $V_g^{d=d_{100}} = \frac{\Delta \rho d_{100}^2 g}{18\mu}$ and

-continued $$V_g^{d=d_i} = \frac{\Delta \rho d_i^2 g}{18\mu}.$$

After cancellation of terms we are left with $$\frac{d_{100}^2}{\ln\frac{r_2}{r_1}} = \frac{d_i^2}{\ln\frac{r_2}{r_i}},$$

or $$\frac{r_i}{r_2} = \left(\frac{r_1}{r_2}\right)^{\left(\frac{d_i}{d_{100}}\right)^2}.$$

Substitution into Eq. 2 gives immediately $$f(d_i) = \frac{1 - \left(\frac{r_1}{r_2}\right)^{2\left(\frac{d_i}{d_{100}}\right)^2}}{1 - \left(\frac{r_1}{r_2}\right)^2}. \qquad \text{Eq. 4}$$

For practical application we need the value of $d_{100}$. According to Eq.1, $$d_{100}^2 = \frac{Q_{100}}{\Sigma} \frac{18\mu}{\Delta \rho g}, \qquad \text{Eq. 5}$$

where $Q_{100}$ is the set flow rate Q. Using the exact expression for $\Sigma$ (Eq. 3), equation 5 becomes $$d_{100}^2 = \frac{Q_{100}}{\omega^2} \frac{18\mu}{\Delta \rho} \frac{\ln\frac{r_2}{r_1}}{Vol}, \qquad \text{Eq. 6}$$

where $Vol = \pi L(r_2^2 - r_1^2)$.

The exact version of the centrifuge cut function is thus given by the combination of Equations 4 and 6.

In the following discussion we use the simpler cut point expression $$f(d_i) = \left(\frac{d_i}{d_{100}}\right)^2, \qquad \text{Eq. 7}$$

which is easily derived.

Algorithm for Intersection of Particle Trajectory with Boundary of Laminar Region An equation was developed for the maximum height in the pond where a particle with diameter $d_i$ should start in order to reach the inner wall of the bowl just in time for capture.

This equation is based on the solution of the geometrical problem of determining the coordinates of the intersection of a straight line with a parabola. The axis of the parabola lies along the inner wall of the bowl and the straight line represents the particle trajectory. Inside the parabola (i.e. within the laminar region) the particle has a velocity vector equal to the vector sum of the velocity in axial direction (X-direction), determined by the flow rate, and the settling velocity (Y-direction), determined by the centrifugal force. If the length of the bowl is $L_B$, then the slope of the line corresponding to this velocity vector is equal to $-(r_2-r_1)/L_B$ for the $d_{100}$ particle. If we normalize this slope to $-1$, then using the cut point expression of Eq. 7, the slope of the trajectory of a particle with diameter $d_i$ is equal to $f(d_i)$. Since $f(d_i)$ can now be considered the cut function that is valid for the case where no turbulence is present, we call this function $f^{lam}(d_i)$. The equation in (X, Y) coordinates for the straight line of the trajectory of a particle with diameter $d_i$ settling in the laminar region is $$Y_{line} = -\frac{(r_2 - r_1)}{L_B} X + (r_2 - r_1).$$

We represent the parabolic boundary of the laminar region in (X, Y) coordinates by $$Y_{parabola} = l\sqrt{X},$$

where l is the parameter that determines the location of the turbulent/laminar boundary within the pond, i.e. the parameter related to the entry length. The higher the value of l, the closer this boundary is to the inlet.

Solving the quadratic equation in X resulting from the intersection condition, we find that the intersection is at a distance from the inlet $$l_b = \left[\frac{L_B}{2(r_2-r_1)f^{lam}(d_i)}\left(l - \sqrt{l^2 + \frac{(2(r_2-r_1)f^{lam}(d_i))^2}{L_B}}\right)\right]^2.$$

The height of this point from the bottom of the pool is $$I_p = l\sqrt{I_b}.$$

If we introduce the parameter $q_t$=turbulent settling velocity/laminar settling velocity, then the cut function corrected for turbulent effects becomes $$f(d_i) = 2l_p + \frac{2(r_2-r_1)q_t l_b}{L_B} f^{lam}(d_i).$$

By the same reasoning a more exact version of the corrected cut function can be derived which uses equation 4 instead of equation 7.

EXAMPLES

With the algorithm provided by the new model three cases were calculated to illustrate the principles along the lines of the preceding discussion. The figures show in the same style as the preceding figure the pond geometry, the parabolic boundary and the particle trajectories. The resulting cut curves are shown together with the original cut curve, uncorrected for turbulent effects.

Figure 4:
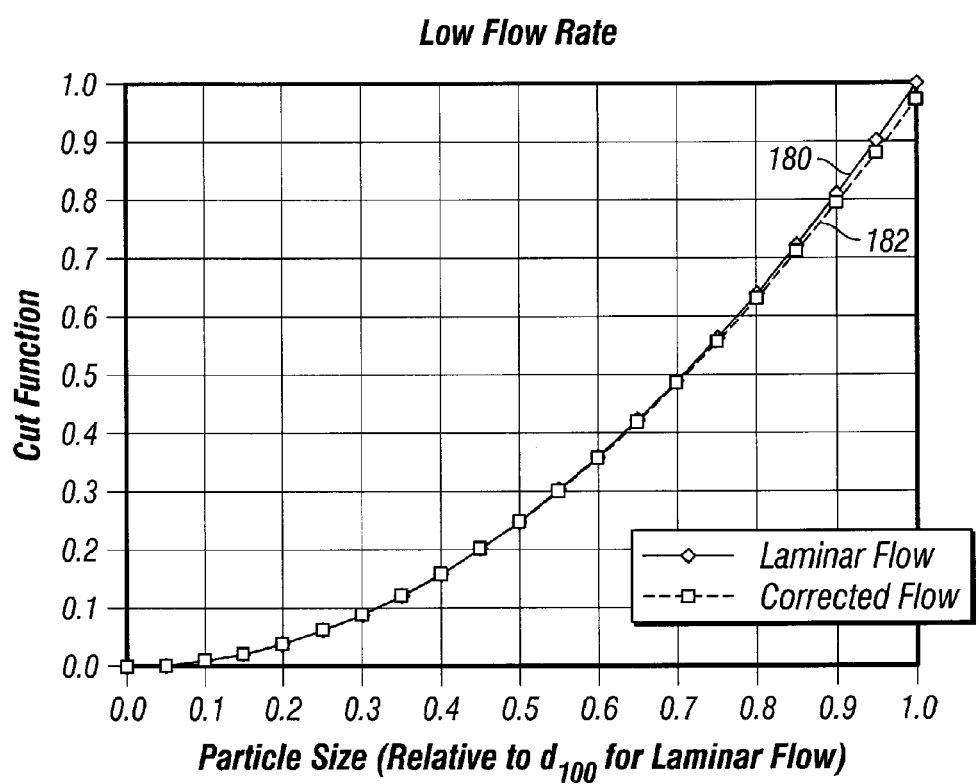
FIG. 4 is a first example of cut point curves as a function of particle size with and without a turbulence correction factor.

The first example is shown in FIG. 4 and is for the case labeled "low flow rate." It is seen that the two curves differ very little. A first curve 180, representing the cut point curve for laminar flow only, is tracked very closely by a second curve 182. Only a slight divergence where the particle size is relatively large as to $d_{100}$ is apparent. The second curve 182 represents a cut function curve that has been corrected to account for turbulence.

Figure 5:
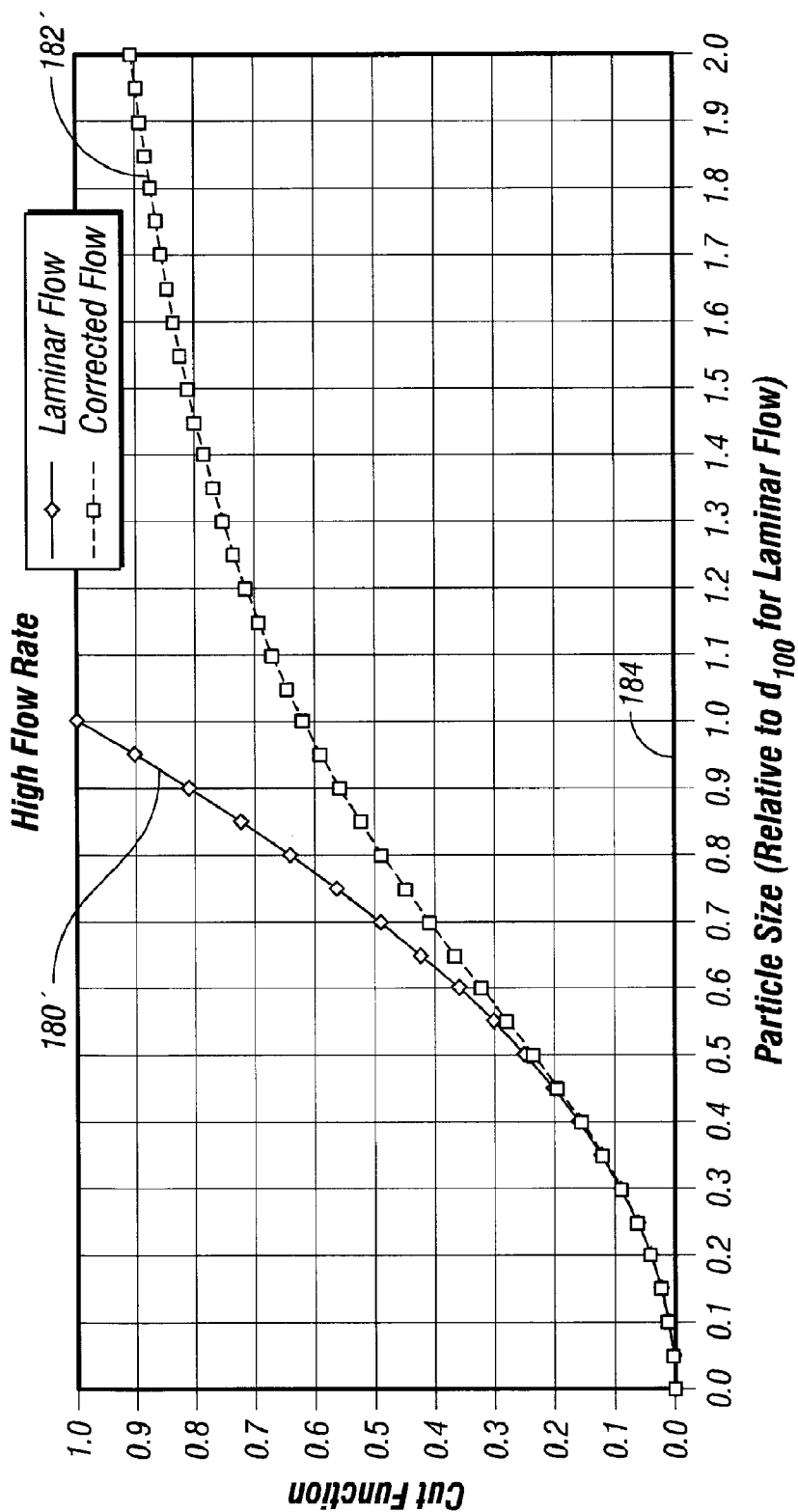
FIG. 5 is a second example of cut point curves as a function of particle size with and without a turbulence correction factor.

In the second example, shown in FIG. 5 a higher flow rate was used. In the case labeled "high flow rate" all other model parameters were kept the same. A first curve 180' is tracked by a second curve 182' only for smaller particle sizes relative to the $d_{100}$ particle size. The second curve 182' representing the cut function corrected for turbulence, indicates that there is a large difference in the predicted cut function curves when the flow rate increases. The effect of turbulence (in this case extending to the end of the bowl) is very large. The particle size axis of this curve has been expanded to twice the original size. Particles that in the absence of turbulence would be captured for 100% are now captured with about 60% and only particles twice the size of the original $d_{100}$ particles are captured for 90%.

Figure 6:
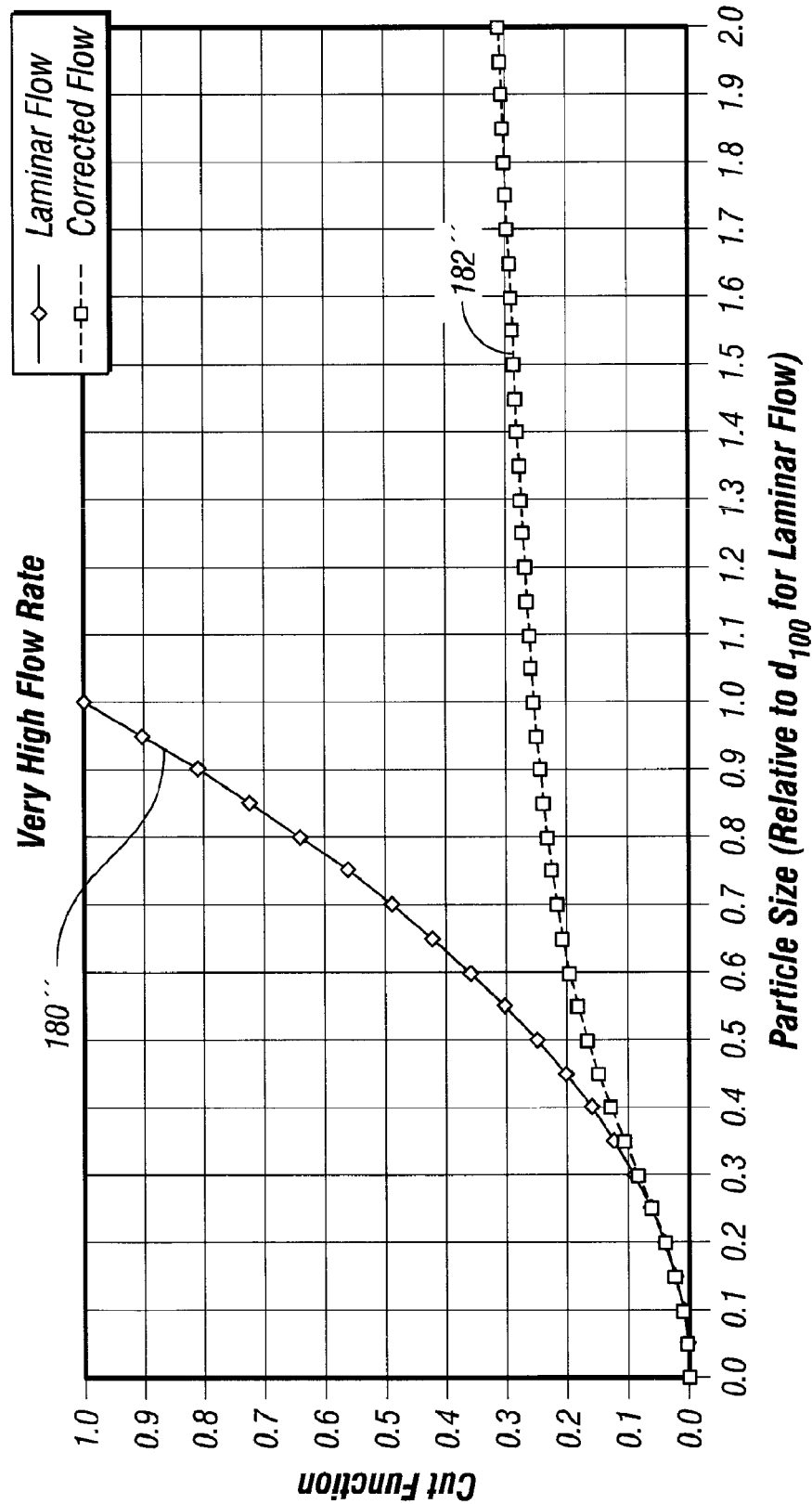
FIG. 6 is a third example of cut point curves as a function of particle size with and without a turbulence correction factor.

In the third example, shown in FIG. 6, an even higher flow rate was used. In the "very high flow rate case" the large particles are, practically speaking, not captured. Curve 180" and curve 182", in which the effect of turbulence is factored, do not track closely, except for the case of small particles. In all three cases the capture probability of small particles is shown to be hardly affected by the turbulence effect.

It is understood that not only flow rate determines this capture chance, but also the geometry of the pond and any features of the bowl and scroll design that promote (or prevent) development of laminar flow.

One of skill in the art will appreciate that a model has been developed to predict the separation efficiency of decanting centrifuges as a function of particle size. The model takes into account the extent to which laminar flow conditions prevail in the centrifuge bowl and predicts how the existence of turbulent regions affect particle settling. This new model can be verified through testing data and thus applied and adjusted to different decanting centrifuge designs. By utilizing the model data, design modification can be tested and discovered that lead to a reduction in non-laminar flow areas which result in a sharper cut. The design modifications also allow the use of higher flow rates. Further it will be appreciated that the disclosed model show the onset of performance deterioration to be a function of the flow rate and particle size. This results in different separation characteristics for different size fraction of various types of solids. Because this model goes beyond the familiar Stokes settling approach and Sigma scaling function, it leads to a better understanding of decreasing centrifuge performance with increasing flow rates. The model also explains how separation to a desired performance standard can be achieved.

Experimentally the performance of a decanting centrifuge and the solids removal efficiency can be determined in the field and compared with the predictions of the above model. The experimental performance of the decanting centrifuge can be evaluated at various parameters, such as drilling fluid density, centrifuge G-force, and feed flow rate. The operating parameters can then be correlated to the solids removal efficiency. The D50 cut point can be determined through mass balance between solid particles within the fluid feed entering the centrifuge, the solids underflow and the liquid effluent.

It will be appreciated by one of skill in the art that given the above models and correlations to the experimental data, one can modify the design of a decanting centrifuge in a manner that takes into account the above. That is to say, one can use the above models and correlations to optimize the performance of a decanting centrifuge. One illustrative example of this is the adjustment of the angle of introduction of the feed into the centrifuge so as to minimize the turbulent flow region and maximize the laminar flow regions. Alternatively the inclusion or repositioning of baffles, vanes, channels or other similar bodies can be used to enhance the establishment of laminar flow within the centrifuge. By doing so, one will be able to achieve more precise separation of solids from the feed with a level of selectivity previously not easily achieved. On the other hand, the inclusion of such baffles, vanes, channels, etc. can be used to establish regions of turbulent flow such that specific particles remain suspended while others settle out and are separated.

It will also be appreciated by one of skill in the art that the models described may be applied to other separation equipment, such as hydrocyclonic separators. The principles involved in the centrifugal models presented may also be applicable to hydrocyclone separators, which use centrifugal forces to separate particles within a fluid stream.

Software into which the above models have been integrated may be used to evaluate and compare various separator designs that utilize centrifugal forces to remove particles from a fluid flow. The known parameters of a decanting centrifuge, for example, may be inputted into an analyzer or interface with the software. Typically the radius of the bowl, $r_2$, the height of the pond, $r_1$, as measured from a central axis, the bowl length, $L_B$, and the rate of rotation as expressed in radians, $\omega$, are known centrifuge parameters. Fluid density, $\rho_f$, particle density, $\rho_s$, fluid viscosity, $\mu$, and flow rate, Q, are measurable feed fluid parameters. Each of these known and measurable parameters may be entered into the analysis software. The software may then calculate a $d_{100}$ cut point from the flow rate and model the cut point for $d_i$ size particles using the models developed. Centrifuge parameters, such as the bowl length, radius, rotational speed, and/or pond height may be manipulated until the desired cut points are obtained.

While the apparatus, compositions and methods disclosed above have been described in terms of preferred or illustrative embodiments, it will be apparent to those of skill in the art that variations may be applied to the process described herein without departing from the concept and scope of the claimed subject matter. All such similar substitutes and modifications apparent to those skilled in the art are deemed to be within the scope and concept of the subject matter as it is set out in the following claims.

What is claimed is:

1. A method of modeling the performance of a decanting centrifuge, wherein the centrifuge includes a bowl having a bowl length, $L_B$, and an inner surface displaced from a central axis by a bowl radius, $r_2$, the centrifuge further including a feed inlet extending along the central axis and providing radial fluid communication of feed fluid with a flow rate, Q, to the bowl, wherein a pond of fluid forms along the inner surface of the bowl when the bowl is rotated to have an angular velocity, $\omega$, the pond having a top surface displaced from the central axis by a pond top radius, $r_1$, the method comprising the steps of:

inputting data related to the centrifuge including the bowl radius, $r_2$, the pond top radius, $r_1$, the bowl length, $L_B$, the angular velocity, $\omega$ into an analyzer;

measuring data related to the feed fluid including a fluid density, $\rho_f$, a particle density $\rho_s$, a fluid viscosity, $\mu$, and the flow rate, Q;

inputting the measured data related to the feed fluid into the analyzer;

calculating a $d_{100}$ cut point as a function of the flow rate;

modeling a first cut function for laminar flow as a function of a particle diameter, $d_i$, using the calculated $d_{100}$ cut point function;

calculating a maximum point within the pond, $I_b$, $I_p$, at which a particle having particle diameter, $d_i$, must reach a laminar boundary layer within the pond to be captured within the bowl, wherein $I_b$ is defined as the distance from the inlet at which the particle having particle diameter, $d_i$ encounters the laminar boundary layer and $I_p$ is defined as the height of the boundary layer above a bottom of the pond;

modeling a second cut function for turbulent flow having a laminar boundary layer along the bowl inner surface as a function of particle diameter, $d_i$.

2. The method of claim 1, wherein the $d_{100}$ cut point as a function of flow rate is calculated using the equation:

$$d_{100}^2 = \frac{Q_{100}}{\omega^2} \frac{18\mu}{\Delta\rho} \frac{\ln\frac{r_2}{r_1}}{Vol}$$

wherein:
$Q_{100}$=is the flow rate at which particles having a particle diameter $d_{100}$ are 100% captured;
$\omega$=angular velocity of the bowl;
$\mu$=fluid viscosity
$\Delta\rho$=the difference between the particle density, $\rho_s$, and the fluid density, $\rho_f$;
$r_2$=the distance between the central axis and the bowl inner surface;
$r_1$=the distance between the central axis and the top surface of the pond when the centrifuge bowl is rotated; and
$Vol=\pi L(r_2^2-r_1^2)$.

3. The method of claim 2, wherein the first cut function for laminar flow is modeled as:

$$f(d_i) = \left(\frac{d_i}{d_{100}}\right)^2;$$

wherein:
$d_i$=a particle diameter for particles captured within the bowl of the centrifuge at a percentage rate of i when the fluid flow rate is $Q_{100}$;
$d_{100}$=the particle diameter for particles that are captured within the bowl of the centrifuge at a percentage rate of 100% when the fluid flow rate is $Q_{100}$.

4. The method of claim 2, wherein the first cut function for laminar flow is modeled as:

$$f(d_i) = \frac{1-\left(\frac{r_1}{r_2}\right)^{2\left(\frac{d_i}{d_{100}}\right)^2}}{1-\left(\frac{r_1}{r_2}\right)^2};$$

wherein:
$r_2$=the distance between the central axis and the bowl inner surface;
$r_1$=the distance between the central axis and the top surface of the pond when the centrifuge bowl is rotated;
$d_i$=a particle diameter for particles captured within the bowl of the centrifuge at a percentage rate of i when the fluid flow rate is $Q_{100}$; and
$d_{100}$=the particle diameter for particles that are captured within the bowl of the centrifuge at a percentage rate of 100% when the fluid flow rate is $Q_{100}$.

5. The method of claim 4, wherein a distance from the inlet at which the particle having particle diameter, $d_i$, encounters the laminar boundary layer, $I_b$, is calculated using the formula:

$$I_b = \left[\frac{L_B}{2(r_2-r_1)f^{lam}(d_i)}\left(l-\sqrt{l^2+\frac{(2(r_2-r_1)f^{lam}(d_i))^2}{L_B}}\right)\right]^2;$$

wherein:
$L_B$=the bowl length;
$r_2$=the distance between the central axis and the bowl inner surface;
$r_1$=the distance between the central axis and the top surface of the pond when the centrifuge bowl is rotated;
$f^{lam}(d_i)$=the model for the first cut function for laminar flow; and
$l$=the inlet length for fully developed laminar flow.

6. The method of claim 5, wherein the height of the boundary layer above a bottom of the pond, $I_p$, is calculated using the formula:

$I_p = l\sqrt{I_b}$.

7. The method of claim 6, further comprising:
calculating a coordinate of a planar segment of fluid flow through the decanting centrifuge for a point at which a particle trajectory through turbulent flow traverses the laminar boundary layer and begins a trajectory through laminar flow for a particle having a particle diameter $d_i$.

8. The method of claim 7, wherein the coordinate is modeled as ($X=I_b$, $Y=I_p$).

9. The method of claim 6, further comprising:
calculating a parameter $q_t$, wherein $q_t$ is calculated using the formula:
$q_t$=turbulent settling velocity/laminar settling velocity.

10. The method of claim 9, wherein the second cut function is modeled as:

$$f(d_i) = 2I_p + \frac{2(r_2-r_1)q_t I_b}{L_B} f^{lam}(d_i);$$

wherein:
$I_p$=the height of the boundary layer above a bottom of the pond;
$r_2$=the distance between the central axis and the bowl inner surface;
$r_1$=the distance between the central axis and the top surface of the pond when the centrifuge bowl is rotated;
$f^{lam}(d_i)$=the model for the first cut function for laminar flow;
$q_t$=turbulent settling velocity/laminar settling velocity; and
$I_b$=the distance from the inlet at which the particle having particle diameter, $d_i$ encounters the laminar boundary layer.

11. A method for predicting effect of turbulence on the cut point function of a separation process comprising:
calculating a particle size $d_{100}$ for a flow rate $Q_{100}$ wherein the particle size $d_{100}$ represents a 100% capture rate for the separation process;

calculating a cut point function assuming laminar flow, wherein the cut point function is determined in terms of a particle size $d_t$ and the particle size $d_{100}$ for which there is 100% capture;

calculating a boundary layer for laminar flow within the separation process;

calculating an intersection function of the boundary layer with a turbulent flow, wherein the intersection function is calculated in terms of the calculated boundary layer, a pond length, and a pond depth;

predicting a cut function for the separation process assuming a straight line particle flow trajectory within a turbulent flow region and a linear sloped particle flow trajectory within the laminar boundary layer.

12. A method of modeling flow characteristics in a decanting centrifuge comprising the steps of:

inputting into a user interface of a software program known centrifuge parameters including a bowl radius, $r_2$, a pond surface radius, $r_1$, and a bowl length, $L_B$;

inputting the user interface of a software program a desired particle size, $d_{100}$, for which 100% of particles of the desired particle size are captured by the centrifuge before being swept out in a fluid overflow;

the software performing a step of:

calculating a cut point for particles having a particle size, $d_t$, resulting from a height within the pond and a distance from a start of a laminar boundary layer in which a particle of the particle size, $d_t$, passes from a turbulent flow into the laminar boundary layer.

13. The method of claim 12, wherein the software further performs the step of:

predicting a capture efficiency of particles having the particle size, $d_t$, as a function of the height and distance at which the particle traverses into the laminar boundary layer.

14. The method of claim 13, wherein the software further performs the step of:

comparing changes in calculated cut points and predicted capture efficiencies for alternative inputted centrifuge known parameters.

* * * * *